United States Patent
Park et al.

(10) Patent No.: US 10,082,705 B2
(45) Date of Patent: Sep. 25, 2018

(54) LIQUID CRYSTAL DISPLAY DEVICE AND METHOD OF MANUFACTURING THE SAME

(71) Applicant: LG Display Co., Ltd., Seoul (KR)

(72) Inventors: SeungRyull Park, Goyang-si (KR); HyunJin Park, Paju-si (KR); JinPil Kim, Paju-si (KR); Han Jin Ahn, Seoul (KR); Hanseok Lee, Seoul (KR); Su-Bin Lee, Busan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/813,029

(22) Filed: Nov. 14, 2017

(65) Prior Publication Data

US 2018/0067365 A1    Mar. 8, 2018

Related U.S. Application Data

(62) Division of application No. 14/307,280, filed on Jun. 17, 2014, now Pat. No. 9,846,332.

(Continued)

(30) Foreign Application Priority Data

Dec. 30, 2013    (KR) ........................ 10-2013-0167915

(51) Int. Cl.
    *G02F 1/1337*     (2006.01)
    *G02F 1/1343*     (2006.01)
    *G02F 1/137*     (2006.01)

(52) U.S. Cl.
    CPC .. *G02F 1/133788* (2013.01); *G02F 1/133723* (2013.01); *G02F 1/134363* (2013.01);

(Continued)

(58) Field of Classification Search
    CPC ......... G02F 1/133723; G02F 1/133788; G02F 2001/13712; Y10T 428/1018; Y10T 428/1023
See application file for complete search history.

(56) References Cited

U.S. PATENT DOCUMENTS

| | | |
|---|---|---|
| 2002/0186330 A1 | 12/2002 | Kawasaki |
| 2003/0112393 A1 | 6/2003 | Watanabe et al. |

(Continued)

FOREIGN PATENT DOCUMENTS

| | | |
|---|---|---|
| CN | 101346342 | 1/2009 |
| CN | 102093560 | 6/2011 |

(Continued)

OTHER PUBLICATIONS

Office Action for Korean Patent Application No. KR 10-2016-7026851, dated Nov. 20, 2017, 6 Pages, (With Concise Explanation of Relevance).

(Continued)

*Primary Examiner* — Sophie Hon
(74) *Attorney, Agent, or Firm* — Fenwick & West LLP

(57) ABSTRACT

Provided is a method of manufacturing new liquid crystal display device according to an embodiment of the present invention. Firstly, an alignment film is formed on a substrate. The alignment film is divided into a first alignment film formed using, as a precursor, liquid-state polyimide that contains a photodecomposition substance and a second alignment film formed using, as a precursor, a polyamic acid that does not contain a photodecomposition substance. UV light is irradiated to the alignment film, and decomposed substances formed by irradiation of the UV light is removed by an at least two-step removing process. By the method of manufacturing a liquid crystal display device according to the exemplary embodiment of the present disclosure, bright spots are minimized in pixels and a brightness of black is (Continued)

lowered, so that a liquid crystal display device with a high contrast ratio can be realized.

11 Claims, 7 Drawing Sheets

Related U.S. Application Data

(60) Provisional application No. 61/835,773, filed on Jun. 17, 2013.

(52) U.S. Cl.
CPC ........... *G02F 2001/13712* (2013.01); *G02F 2001/134372* (2013.01); *Y10T 428/1018* (2015.01); *Y10T 428/1023* (2015.01)

(56) References Cited

U.S. PATENT DOCUMENTS

| | | | |
|---|---|---|---|
| 2004/0170777 A1* | 9/2004 | Tomioke | G02F 1/1337 428/1.2 |
| 2006/0061719 A1 | 3/2006 | Tomioke et al. | |
| 2006/0280881 A1 | 12/2006 | Park | |
| 2010/0066961 A1 | 3/2010 | Matsui et al. | |
| 2011/0115999 A1* | 5/2011 | Uchino | G02F 1/133788 349/56 |
| 2011/0199565 A1* | 8/2011 | Kunimatsu | G02F 1/133723 349/123 |
| 2011/0221984 A1 | 9/2011 | Matsumori et al. | |
| 2012/0135661 A1 | 5/2012 | Imanishi et al. | |
| 2012/0172522 A1 | 7/2012 | Shin et al. | |
| 2012/0298989 A1 | 11/2012 | Fujii | |
| 2014/0218667 A1 | 8/2014 | Miyachi et al. | |

FOREIGN PATENT DOCUMENTS

| | | |
|---|---|---|
| CN | 102687337 | 9/2012 |
| JP | 2006-350347 | 12/2006 |
| JP | 2012-113212 | 6/2012 |
| JP | 2013-101206 A | 5/2013 |
| KR | 2000/0012071 A | 2/2000 |
| KR | 2010/0062923 A | 6/2010 |
| KR | 20110064102 | 6/2011 |
| KR | 10-2011-0131223 A | 12/2011 |
| KR | 2012/0138023 A | 12/2012 |
| KR | 10-2013-0050862 A | 5/2013 |
| TW | 201113155 A | 4/2011 |
| WO | WO 2008153287 A1 | 12/2008 |
| WO | WO 2013/024749 A1 | 2/2013 |
| WO | WO 2013/039168 A1 | 3/2013 |

OTHER PUBLICATIONS

Office Action for Taiwanese Patent Application No. TW10421145810, dated Aug. 31, 2015, 5 pages. (With Concise Explanation of Relevance).
PCT International Search Report for PCT/KR2014/005312, dated Oct. 2, 2014, 3 pages.
Office Action for U.S. Appl. No. 14/307,237, dated Feb. 3, 2017, 16 Pages.
European Search Report for European Patent Application No. EP 14813994.2, dated Dec. 2, 2016, 9 Pages.
Chen, Y., et al., "High Performance Negative Dielectric Anisotropy Liquid Crystals for Display Applications," Crystals, 2013, pp. 483-503.
Office Action for U.S. Appl. No. 14/307,280, dated Apr. 13, 2017, 12 Pages.
Office Action for U.S. Appl. No. 14/307,280, dated Nov. 9, 2016, 11 Pages.
Office Action for Chinese Patent Application No. CN 201480033813.9, dated Jan. 29, 2018, 14 Pages (with English Translation).

* cited by examiner

LIQUID CRYSTAL DISPLAY DEVICE AND METHOD OF MANUFACTURING THE SAME

CROSS-REFERENCE TO RELATED APPLICATIONS

This application is a divisional of U.S. patent application Ser. No. 14/307,280 filed on Jun. 17, 2014 which claims priority under 35 U.S.C. § 119(e) to U.S. Provisional Patent Application No. 61/835,773 filed on Jun. 17, 2013 and under 35 U.S.C. § 119(a) to Korean Patent Application No. 10-2013-0167915 filed on Dec. 30, 2013, each of which are incorporated herein by reference.

BACKGROUND OF THE INVENTION

1. Field of the Invention

The present disclosure generally relates to a display device, and more particularly to a liquid crystal display (LCD) device including a photo-alignment film and a method for manufacturing the same.

2. Description of the Related Art

Unlike twisted nematic (TN) liquid crystal displays, in in-plane-switching (IPS) liquid crystal displays, the electrodes for generating electrical fields to control the liquid crystal (LC) are on a single substrate in the form of strip electrodes. With this electrode arrangement, electric field-induced molecular reorientation occurs mainly in the horizontal direction, providing much lower viewing angle dependence than in TN and vertical alignment (VA) LCD devices. Further, LCD devices having the fringe-field-switching (FFS) mode, which is a more advanced version of the IPS technology, have narrower electrode width and gap so that the areas above the electrodes can also contribute to the switching process.

Positive dielectric anisotropy LC has been commonly used in both IPS mode and FFS mode LCD devices. However, most IPS mode and FFS mode LCD devices have a structure in which the distance between the pixel electrode and common electrode is greater than the cell gap. In such a configuration, strong vertical electric fields tend to form above the electrode surfaces. When the positive type liquid crystal is used, such vertical electric fields can cause tilt rather than twist of the liquid crystal material, leading to insufficient phase retardation. This can severely hamper the peak light transmittance at a certain frame, which in turn causes an asymmetrical brightness between the frames.

Recently, it has been found that employing negative dielectric anisotropy LC in the FFS mode LCD device has several advantages over the positive dielectric anisotropy LC, such as higher transmittance, single gamma curve, lower cell gap dependence and weaker flexo-electric effect. Nevertheless, several technical challenges remain in perfecting the use of negative dielectric anisotropy LC in the LCD devices.

SUMMARY OF THE INVENTION

Prior attempts in perfecting the use of the negative dielectric anisotropy LC in IPS mode and/or FFS mode LCD devices have been mainly focused on the LC material itself. However, inventors of the embodiments in the present disclosure have recognized that optimizing the properties of the alignment films for the negative dielectric anisotropy LC is just as important as the optimization of the LC material.

Accordingly, an aspect of the present disclosure relates to a method of manufacturing a liquid crystal display device. In an embodiment, the method includes formation of alignment film on a substrate. The alignment film should have high weight average molecular weight of the constituent material, which is polyimide. Thus, the alignment film should include polyimide chain having a molecular weight of at least 100,000 Da or more. Once the alignment film is formed on the substrate, a photo-alignment process is performed by irradiating the alignment film with linearly polarized ultra violet (UV) light. In the alignment film, polyimide chains oriented parallel to the polarization direction of the irradiated UV light is cleaved by a photo-decomposition reaction. The LC molecules would be aligned in the direction of the maximum density of un-cleaved polyimide chains on the alignment film. The cleaved part of the polyimide chain, on the other hand, would be an impurity that only hinders the proper orientation of the LC molecules. Starting from the alignment film with high weight average molecular weight, the cleaved parts would also have high molecular weight. Accordingly, a chemical impurity molecule removal (C-IMR) process is performed on the alignment film to remove the high molecular weight impurities (cleaved parts).

In some embodiments, the C-IMR process is carried out by applying a lactate based organic solution on the alignment film. This process causes the alignment film surface to swell and substantially removes the high molecular weight impurities from the surface of the alignment film.

In some embodiments, a thermal impurity molecule removal (T-IMR) process is performed on the alignment film after the C-IMR process. While the alignment film surface that is swollen during the C-IMR process can be simply dried, the extra heat on the alignment film during the T-IMR process can restructure the alignment film surface. Further, the T-IMR process can evaporate the low molecular weight residual impurities that remains on the alignment film. In some embodiments, the alignment film may be rinsed with deionized (DI) water and/or calcination to remove other types of impurities or byproducts generated during the T-IMR process.

In one embodiment, the method of manufacturing a liquid crystal display device includes applying a precursor mixture dispersed in an organic solution on a substrate. The precursor mixture includes polyimide with a photo-decomposable material and polyamic acid without the photo-decomposable material.

According to an exemplary embodiment of the present disclosure, there is provided a novel method of forming an alignment film. Firstly, an alignment film is applied on a substrate and then dried. Drying of the alignment film is carried out in order to separate a first alignment film formed using, as a precursor, liquid-state polyimide containing a photodecomposition substance and a second alignment film formed using, as a precursor, a polyamic acid not containing a photodecomposition substance from the substrate. UV light is irradiated to the alignment film, and in a first decomposed substance removing step, a decomposed substance generated by the UV light is removed by swelling a surface of the alignment film. Further, in a second decomposed substance removing step, the alignment film is heat-treated to retexture the swollen surface of the alignment film, and residues of the decomposed substance are removed. By the method of forming an alignment film according to the exemplary embodiment of the present disclosure, occurrence of bright spots is minimized and a molecular weight of the alignment film is maintained, so that a liquid crystal display device with an anchoring force maintained can be realized.

In another aspect, the present disclosure relates to a liquid crystal display device. According to an exemplary embodiment of the present disclosure, there is provided a novel liquid crystal display device. The liquid crystal display device includes an alignment film aligned with UV light. The liquid crystal display device includes a substrate and the alignment film formed on the substrate. On the alignment film, a liquid crystal layer is formed. The alignment film is formed into a double-layer structure, and a decomposed substance generated by irradiation of UV light is substantially removed by an at least two-step removing process. In a liquid crystal display device according to an exemplary embodiment of the present disclosure, an anchoring force of an alignment film is improved and also, a volume resistance of the alignment film is reduced. Thus, AC image sticking and DC image sticking can be minimized at the same time.

When the alignment film of the liquid crystal display device is formed in such processes, the liquid crystal display device can exhibit strong anchoring force, reduced optical defects such as uneven bright spots and AC/DC image sticking problems.

BRIEF DESCRIPTION OF THE DRAWINGS

The above and other aspects, features and other advantages of the present disclosure will be more clearly understood from the following detailed description taken in conjunction with the accompanying drawings.

DETAILED DESCRIPTION

Figure 1A:
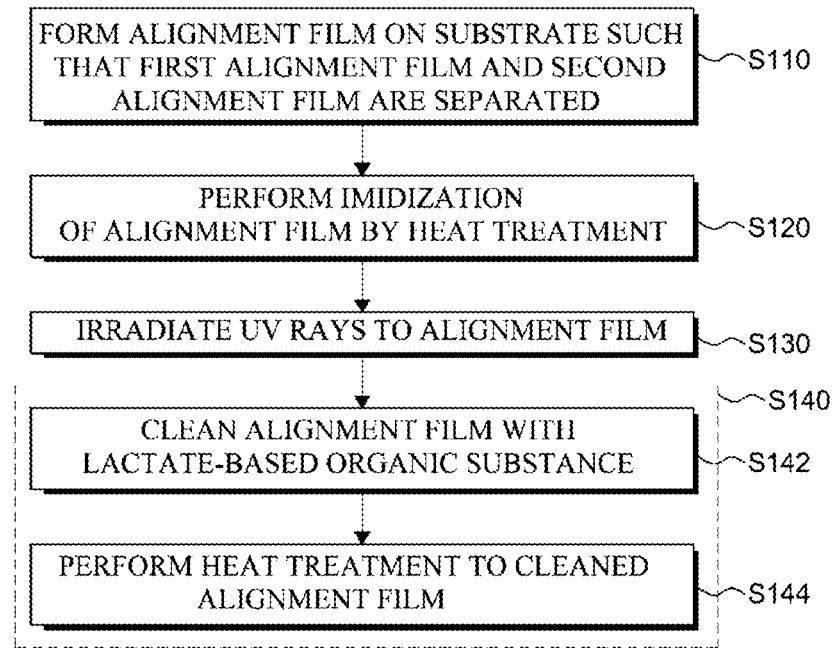
FIG. 1A is a flowchart of an exemplary method of manufacturing a liquid crystal display device according to an embodiment of the present disclosure.

Various advantages and features of the present invention and methods accomplishing thereof will become apparent from the following description of embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

In the drawings, size and thickness of each element are arbitrarily illustrated for convenience of description, and the present invention is not necessarily limited to those illustrated in the drawings. The same reference numerals indicate the same elements throughout the specification.

The components of various embodiments of the present invention can be partially or entirely bonded to or combined with each other and can be interlocked and operated in technically various ways as can be fully understood by an ordinary person skilled in the art, and the embodiments can be carried out independently of or in association with each other.

Hereinafter, various embodiments of the present invention will be described in detail with reference to the accompanying drawings.

In a liquid crystal display (LCD) device, a layer of liquid crystal (LC) molecules is sandwiched between a pair of alignment films, which provides the anchoring force for controlling the orientation of the LC molecules. The alignment film can be imparted with anchoring force by a contact-type alignment process. For instance, rubbing the surface of the alignment film has been a simple way of achieving a preferred orientation. However, rubbing may produce dust, static charging and mechanical damage which can result in various defects, such as image blurring, image sticking as well as the color shifting. Scratches and declination at a stepped portion of a thin-film transistor pattern may deteriorate the production yield.

One of the more attractive alternatives to such a contact-type alignment process is the generation of a surface anisotropy of an alignment film by photo-chemical reaction, which is referred to as the photo-alignment process. By using the photo-alignment process, several issues involved in the contact-type alignment process can be eliminated. The photo-alignment process can be used for the alignment films in various types of LCD devices, including the vertical alignment (VA) mode LCD devices. For IPS and FFS mode LCD devices, the photo-alignment process is especially an attractive way of imparting anisotropy in the alignment film as the LC molecules are aligned and operated parallel to the substrate and do not require a pre-tilt angle.

Referring to FIG. 1A, the method of manufacturing a liquid crystal display device includes a step S110 of forming an alignment film on a substrate. It should be noted that the alignment films in the present disclosure are the ones that can have a surface anisotropy by photo-alignment process. As will be described in further detail below, the photo-alignment can be achieved by exposing the alignment film with polarized ultraviolet (UV) light. While there are several materials that react with the UV light to provide a surface anisotropy, the alignment films of the embodiments of the present disclosure use polyimide that undergoes photo-decomposition upon UV light irradiation.

Conventionally, polyimide was considered to be insoluble in solvents that are usable for forming an alignment film of LCD devices. For this reason, polyamic acid and/or a polyamic acid ester, which are the precursors of polyimide, were dissolved in a solvent. Then, a layer of this solution coated on a substrate was heated until the polyimide precursors within the solution are imidized into polyimide to form an alignment film.

A longer polyimide chain is preferred to increase the anisotropy in the alignment film. Given that polymers with diverse molecular weights exist in the alignment film, the molecular weight of the alignment film can be evaluated in terms of a weight average molecular weight. As such, a higher weight average molecular weight of polyimide of the alignment film equates to more interaction sites with the LC molecules, which in turn provides improved anchoring force of the alignment film.

However, imidization of the polyamic acid is accompanied by a reverse reaction, which causes considerable portion of the polyamic acid to reverse back into diamine and dianhydride. This reverse reaction of the polyamic acid inevitably lowers the weight average molecular weight of the polyimide in the alignment film. While the imidization of polyamic acid ester is not accompanied by the reverse reaction as in the polyamic acid, several additional processes are required to form the polyamic acid ester. Further, several byproducts are generated during making the polyamic acid ester, which must be removed before imidizing it to form polyimide. Any remaining byproducts from the esterization can lead to various defects such as weak adhesion of the resulting alignment film to the substrate and improper alignment of the LC molecules, especially for the negative dielectric anisotropy LC molecules. For this reason, forming an alignment film by using polyamic acid ester requires very extensive cleaning process, which can last for several hours if not days. Accordingly, it is extremely difficult to achieve a desired level of weight average molecular weight in the alignment film by using only the conventional polyimide precursors, such as polyamic acid However, the inventors of the embodiments in the present disclosure recognized that, a remarkably high average molecular weight can be achieved in an alignment film by using a precursor mixture including polyimide, which is already in an imidized form. Accordingly, to form the alignment film, 5 parts by weight of the precursor mixture, which includes the polyimide with cyclobutane and the polyamic acid with cyclobutane, is dissolved in 95 parts by weight of an organic solvent, and casted on a substrate.

While the precursor mixture includes polyimide that is soluble in an organic solvent, the precursor mixture also include at least one polyimide precursor such as polyamic acid.

The polyimide chains of the resulting alignment film must be sensitive to the UV light so that the anisotropy can be imparted in the alignment film. Accordingly, the precursor mixture must include polyimide with a photo-decomposable material that undergoes a photo-decomposition reaction upon UV irradiation. Also, the precursor mixture should also include other polyimide precursor with the photo-decomposable material.

In way of an example, the precursor mixture includes polyimide with cyclobutane and polyamic acid with cyclobutane. While cyclobutane is frequently used as an example of the photo-decomposable material included in the materials of the precursor mixture, it should be appreciated that other photo-decomposable material by UV light may be used in place of or in addition to the cyclobutane. However, the photo-decomposable material should be able to provide polyimide chains with comparable molecular weight as that of the polyimide chains with cyclobutane.

The solubility of the polyimide is a unique feature that allows to use pre-imidized material (i.e., polyimide) in the precursor mixture for forming the alignment film. Of course, the polyimide included in the precursor mixture should be soluble in an organic solvent that is suitable for use during manufacturing an alignment film of LCD devices. For example, the polyimide in the precursor mixture has high solubility in solvents, such as N-methyl-2-pyrrolidone (NMP), butyl cellosolve (BCS) and a mixed solvent of NMP and BCS.

Also, the type of solvents for dissolving the precursor mixture greatly affects the imidization ratio as well as the molecular weight of the resulting polyimide in the alignment film. The overall imidization reaction involves a relatively weak base reacting with a non-protic anhydride to yield a strong protic acid. In general, more basic aprotic solvent enhances the forward reaction, which forms polyimide, and allows for the reverse reaction to occur at higher temperature. In this regards, dipolar amide solvent is preferred as, without hampering the solubility of the polyimide in the precursor mixture, a strong hydrogen bond between the carbonyl group and hydrogen of —COOH will make more portion of the polyamic acid and/or polyamic acid ester to imidized into polyimide.

A molecular formula of the polyimide containing a photo-decomposable material is represented by Chemical Formula 1.

[Chemical Formula 1]

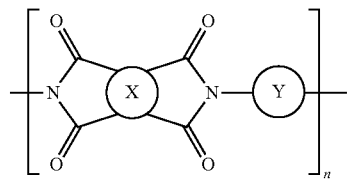

In Chemical Formula 1, n represents a natural number, X represents a photodecomposition substance sensitive to UV light, for example, preferably cyclobutane, and Y represents an aromatic hydrocarbon group having 2 or more rings.

As discussed above, the photo-decomposable material can be the cyclobutane having the following structure:

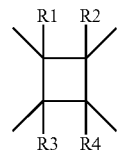

Here, each of R1, R2, R3, and R4 may be one or more selected from the group consisting of a hydrogen atom, a fluorine atom, a chlorine atom, a bromine atom, a phenyl group, an alkyl group having 1 to 6 carbon atoms, an alkoxy group having 1 to 6 carbon atoms, a vinyl group (—(CH2)mCH=CH2, m=0~2), and an acetyl group (—(CH2)m-C≡CH, m=0~2).

The aromatic hydrocarbon group has a structure as follows:

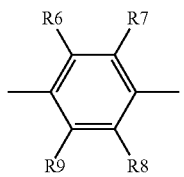

Here, each of R6, R7, R8, and R9 may be one or more selected from the group consisting of a hydrogen atom, a fluorine atom, a chlorine atom, a bromine atom, a phenyl group, an alkyl group having 1 to 6 carbon atoms, an alkoxy group having 1 to 6 carbon atoms, a vinyl group (—(CH2)mCH=CH2, m=0~2), and an acetyl group (—(CH2)m-C≡CH, m=0~2).

When Y of the polyimide is aromatic hydrocarbon group having one ring, the polyimide will not have sufficient solubility to be used in the precursor mixture. Accordingly, Y of the polyimide should include an aromatic hydrocarbon group having at least two rings to increase the solubility so that it can be in the dissolved in the solvent and remain in a liquid-state at the room temperature.

The polyimide to be used in the precursor mixture for the formation of an alignment film may be imidized by a chemical imidization method, which may require a final treatment where the precursor powder is heated briefly to temperatures near 300° C. (>Tg) to complete the imidization and remove traces of any solvent. In such a chemical imidization process, the reverse reaction characteristic of the thermal imidization process used during the formation of the alignment film is minimal, and thus polyimide with very high molecular weight can be obtained. However, the chemical imidization process is not suitable for directly forming the alignment film as processes involved during the chemical imidization can damage the other components of the LCD device. By using the polyimide with high molecular weight (e.g., 100,000 Da or more), the alignment film can have a high weight average molecular weight after the thermal imidization process. For example, the alignment film after the thermal imidization process of the present disclosure may have a weight average molecular weight of about 10,000 Da to 15,000 Da, and more preferably higher than 15,000 Da.

Referring to S120 of FIG. 1A, a thermal imidization process is performed on the layer of the precursor solution on the substrate. The heating process can be carried out at a temperature ranging from 100° C. to 350° C., more preferably at about 200° C. to 300° C., and more preferably at about 200° C. to 250° C.

In some embodiments, the layer of precursor mixture solution may be heated gradually to about 200° C. to 250° C., depending on the stability and Tg of the polyimide. Alternatively, the layer of precursor mixture solution may be heated and held at several intermediate temperature ranges, each ranges for a certain period of time, and cooled to room temperature. For example, the layer of precursor mixture solution can be heated to 100° C. and held for a period, heated from 100° C. to about 200° C. and held for a next period, and cooled down to room temperature.

The polyimide in the precursor mixture, which is already imidized to have sufficiently high molecular weight, will simply be cured during the heating process, largely maintaining its original molecular weight. Thus, using the polyimide in the precursor mixture allows to achieve a desired weight average molecular weight of the alignment film even after the imidization process of the polyamic acid therein. For example, at least 80% of imidization ratio can be achieved from a precursor mixture in which the polyimide with cyclobutane accounts for at least 30% or more with the remainder being polyamic acid with/without cyclobutane.

As a ratio of the polyimide with cyclobutane is increased in the precursor mixture, the imidization ratio in the alignment film can be increased so that higher weight average molecular weight can be achieved in the alignment film. However, excess amount of polyimide in the precursor mixture may can complicates the thermal imidization processes for forming the alignment film as it can require changes in various parameters such as the solvent and the temperature for imidization of the polyamic acid in the precursor mixture. As such, the polyimide with cyclobutane should not account for more than 90% within the precursor mixture.

In some embodiments, the precursor mixture for forming the alignment film includes a plurality of precursors having at least two different weight average molecular weights. Using the precursor mixture with at least two different weight average molecular weights, an alignment film can be formed to have two portions, each with different characteristic.

Figure 1B:
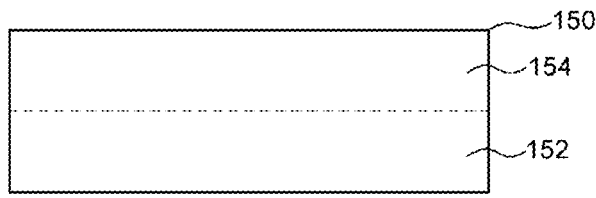
FIG. 1B is a schematic cross-sectional view provided for explaining formation of an alignment film in a method of manufacturing a liquid crystal display device according to an exemplary embodiment of the present disclosure.

FIG. 1B is a schematic cross-sectional view showing the precursor mixture having an exemplary structure of a multi-layered precursor 150 for forming an alignment film. It should be noted that, in a LCD device, any one of both of the pair of alignment films can be formed form the multi-layered precursor 150.

Similar to the previous embodiment, the precursor mixture (5 parts by weight) is dissolved in an organic solvent (95 parts by weight), and casted on the substrate. As time passes, the precursor mixture in the solvent settles and phase separation occurs between the precursors. On the substrate, the multi-layered precursor 150 is formed due to the molecular weight difference between the substances of the first and second precursors. The difference of the weight average molecular weight between the substances of the first and second precursors is sufficient so long as it causes the phase separation between in the precursor mixture. However, it is important that the precursors without the photo-decomposable material to have higher weight average molecular weight than the precursors with the photo-decomposable material.

In way of an example, the precursor mixture includes polyimide with a photo-decomposable material, polyamic acid with a photo-decomposable material and polyamic acid without a photo-decomposable material. Accordingly, the weight average molecular weight of the polyamic acid without the photo-decomposable material should be higher than that of the polyimide with the photo-decomposable material and the polyamic acid with the photo-decomposable material.

The molecular formula of the polyimide with the photo-decomposable material may also be represented by the Chemical Formula 1 shown above, and the polyamic acid without a photo-decomposable material is represented by the Chemical Formula 2.

[Chemical Formula 2]

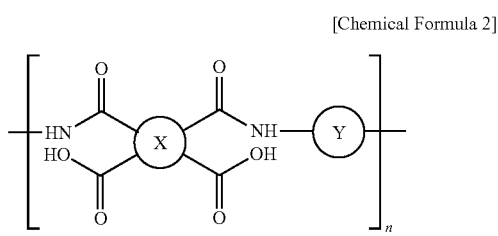

In Chemical Formula 2, X represents an aromatic hydrocarbon group having 2 or more rings, and Y represents an aromatic hydrocarbon group having one or more rings.

The aromatic hydrocarbon group has a structure as follows.

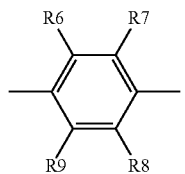

In Chemical Formula 2, each of R6, R7, R8, and R9 may be one or more selected from the group consisting of a hydrogen atom, a fluorine atom, a chlorine atom, a bromine atom, a phenyl group, an alkyl group having 1 to 6 carbon atoms, an alkoxy group having 1 to 6 carbon atoms, a vinyl group (—(CH2)mCH═CH2, m=0~2), and an acetyl group (—(CH2)m-C≡CH, m=0~2).

In this embodiment, the polyimide in the precursor mixture has an aromatic hydrocarbon group having 2 or more rings as Y so that it has a higher weight-average molecular weight than the conventional polyamic acid having a short Y. As such, polyamic acid without the cyclobutane should have an aromatic hydrocarbon group having 2 or more rings as X in order for the polyimide with cyclobutane to be positioned above the polyamic acid without the cyclobutane. In this setting, the polyamic acid without cyclobutane moves toward the substrate, forming the lower precursor layer 152, and the polyimide with cyclobutane floats above the polyamic acid without cyclobutane, forming the upper precursor layer 154.

Since the formation of the first precursor layer 154 and second precursor layer 152 depends on the molecular weight of their constituent materials, the boundary between the first precursor layer 154 and the second precursor layer 152 may not be perfect. Accordingly, some polyamic acid without cyclobutane may remain in the first precursor layer 154 and some polyimide with cyclobutane may remain in the second precursor layer 152. However, the first precursor layer 154 should be primarily formed of the polyimide with cyclobutane and polyamic acid with cyclobutane, whereas the second precursor layer 152 should also be primarily formed of the polyamic acid without the cyclobutane.

After the precursor mixture casted on a substrate settles and phase separated into the first precursor layer 154 and the second precursor layer 152, thermal imidization process is carried out.

Upon the thermal imidization, the first precursor layer 154 forms the upper portion of the alignment layer that would be closer to the liquid crystal layer upon assembly of the LCD device. As described above, the polyimide with cyclobutane in the first precursor layer 154 largely maintains its original molecular weight. Even though some polyamic acid with cyclobutane in the first precursor layer 154 can reverse back to diamine and dianhydride during the imidization process, a high imidization ratio can be achieved from the first precursor layer 154 due to the inclusion of the polyimide. Accordingly, the upper portion of the resulting alignment film will achieve a high weight average molecular weight.

Upon the thermal imidization, the second precursor layer 152, which includes polyamic acid without cyclobutane, forms the lower portion of the alignment film that is closer to the substrate. Upon imidization of the polyamic acid without cyclobutane produces polyimide without cyclobutane in the lower portion of the alignment film. Without the polyimide in the second precursor layer 154, the lower portion of the alignment film would have a lower weight average molecular weight than the upper portion after the imidization. Also, cleaving of the polymer chain would not occur in the lower portion of the alignment film during the UV irradiation as the polyimide in the lower portion does not include the cyclobutane. This would not affect much in the anchoring force of the alignment film as the lower portion would be positioned towards the substrate. Without the photo-decomposition, the lower portion of the alignment film can help maintain the thickness of the alignment film.

Also, the absence of cyclobutane allows the lower portion to exhibit a lower volume resistance than the upper portion of the alignment film. For instance, the upper portion of the alignment film may have a volume resistance of about $1.0 \cdot 10^{15}$ Ω·cm or more, but the lower portion of the alignment film has a volume resistance of about $1.0 \cdot 10^{13-14}$ Ω·cm. Accordingly, the lower portion of the alignment film can facilitate faster discharging of accumulated electric charges to help reduce the DC image sticking problem from the LCD device.

In some embodiments, the precursor mixture may further include polyamic acid ester without the photo-decomposable material to increase the strength of the alignment film. Since the polyamic acid ester does not have the photo-decomposable material, it should have sufficiently high weight average molecular weight so that it is included in the lower precursor layer 152. However, an excessive amount of polyamic acid ester should be avoided as it can result in poor adhesion of the alignment film on the substrate.

Referring back to S130 of FIG. 1A, the alignment film formed on the substrate is irradiated with UV light. The alignment film is irradiated with the linearly polarized UV light can induce a uniform parallel alignment of LC molecules. The average molecular orientation of the LC molecules would be parallel to the film surface and perpendicular to the polarization direction of the linearly polarized UV light. This is because of anisotropic photo-decomposition of the polyimide main chains. The polyimide chain oriented parallel to the polarization direction of the irradiated UV light is cleaved more easily than the polyimide chain oriented perpendicular to it. Thus, the orientational distribution of the polyimide chains becomes anisotropic after the UV exposure. This anisotropic orientation of the polyimide chains aligns the LC molecules perpendicular to the polarization direction, which corresponds to the direction of the maximum density of un-cleaved polyimide chains on exposure.

During this process, however, cleaved byproducts with maleimide end are generated. The molecular weight of cleaved byproducts may vary depending on a length of a main chain.

Figure 1C:
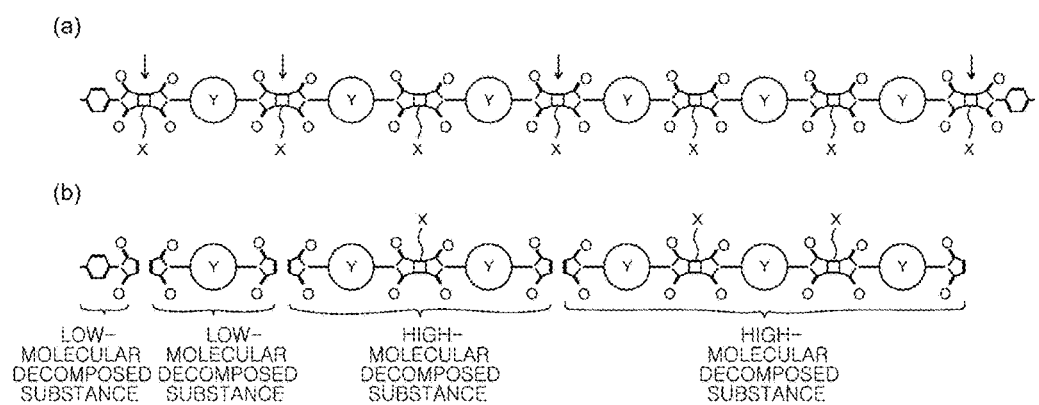
FIG. 1C shows schematic diagrams provided for explaining a decomposed substance after irradiation of UV light in a method of manufacturing a liquid crystal display device according to the exemplary embodiment of the present disclosure.

FIG. 1C, parts (a) and (b) illustrate the state of the polyimide chain in the alignment film before and after the UV irradiation. FIG. 1C, part (a) illustrates the main chain of the polyimide containing cyclobutane as X and an aromatic hydrocarbon group having 2 or more rings as Y. When the polyimide of the alignment film of the present disclosure is irradiated with UV light, the cyclobutane in the polyimide chain reacts with the UV light and is decomposed such that cleaved byproducts with maleimide end are generated.

Unlike the conventional alignment film formed from a precursor that does not include polyimide, use of the precursor mixture provides polyimide with very large molecular weight allows to achieve high weight average molecular weight of polyimide in the alignment film. The high molecular weight of the polyimide in the alignment film makes the alignment film unique in that the cleaved parts from the main chain also have quite high molecular weight.

FIG. 1C, part (b) illustrates cleaved parts having maleimide end after the cyclobutane is decomposed. The cleaved parts from the main chain may have different molecular weight. As shown in FIG. 1C, part (b), some cleaved parts may have a benzene ring without Y or only a single Y, resulting in a low-molecular weight cleaved parts. Some cleaved parts may contain two or more Y, resulting in a high-molecular weight cleaved parts. Since these cleaved parts hamper the anisotropy of the alignment film, they are impurities that need to be removed from the alignment film.

Referring back to FIG. 1A, in S140, the impurities of various molecular weights are removed from the alignment film. The larger the molecular weight of the impurity, greater the magnitude of negative impact it has in the alignment performance. Thus, it is imperative that such large molecular weight impurities be removed from the alignment film, especially from the surface and the upper portion of the alignment film that will be positioned closer to the liquid crystal layer. However, the large molecular weight of the impurities makes it extremely difficult to remove them from the alignment film.

Accordingly, in S142, a chemical impurity molecule removal (C-IMR) process is performed on the alignment film to remove the high molecular weight impurities (i.e., cleaved parts with two or more Y). The C-IMR process is performed by cleaning the surface of the alignment film with a proton type organic solvent. Among the proton type organic solvent, the lactate-based organic solvent is particularly optimized at removing the large molecular weight impurities. Unlike IPA (isopropyl alcohol), PGMEA (propylene glycol monomethyl ether), NMP and Acetone, the lactate-based organic solvent does not affect the main chain of the polyimide, which is necessary for providing alignment capability in the alignment film.

In some embodiments, the C-IMR process is carried out by applying a lactate-based organic solution on the alignment film. The lactate-based organic solvent is remarkably effective in removing ionic impurities and more effective in removing decomposed substances of a photo-decomposed material as compared with T-IMR process of simply rinsing the alignment film with DI water. The lactate-based organic solvent is much more effective in removing a high-molecular decomposed substance because it dissolves maleimide formed by decomposing polyimide with cyclobutane. That is, the lactate-based organic solvent does not dissolve the main chain of polyimide but dissolves maleimide, and, thus, substances decomposed by UV light can be selectively removed.

The lactate-based organic solvent may include one or more of methyl lactate, ethyl lactate, n-propyl lactate and n-butyl lactate. If desired, the lactate-based organic solvent may be mixed with deionized (DI) water. In the preferred embodiment, the lactate-based organic solvent is ethyl lactate. Ethyl lactate has a low volatility as compared with methyl lactate and has a low molecular weight as compared with n-propyl lactate or n-butyl lactate, which makes it more suitable for removal of the large molecular weight impurities from the alignment film.

The C-IMR process with lactate-based organic solution swells the surface the alignment film. The "swelling" refers to a phenomenon that polyimide chain on the surface are not dissolved by the lactate-based organic substance, but the lactate-based organic substance is inserted and expands the space between chains of the polyimide on the surface. The swollen surface of the alignment film makes it easier to remove the large molecular weight cleaved parts from the alignment film. Using the lactate-based organic solvent enables the method to remove impurities having high-molecular weight for example, molecular weight 100,000 Da or more. Non-proton type solvent, such as NMP, Acetone, GBL and DMF dissolves the main chain of the polyimide, thus cannot be used in removing the large molecular weight impurities.

The C-IMR process by a lactate-based organic solvent can be performed on the alignment film by a shower spray method, a puddle method, or a dipping method, or any other method available for alignment film. When using the shower spray method, the C-IMR process is carried out by spraying the lactate-based organic solvent through a nozzle at a temperature in a range of 20° C. to 60° C. at a flow rate of 30 ppm for a period of time ranging from about 10 to about 100 seconds.

As mentioned, the lactate-based organic solvent swells the alignment film and removes the high-molecular weight impurities and decomposed material from the alignment film.

In some embodiments, a thermal impurity molecule removal (T-IMR) process is performed on the alignment film after the C-IMR process as shown in S144 of FIG. 1A. In the T-IMR process, post-baking treatment is performed on the alignment film. This process removes ion impurities and also evaporates residual low molecular weight impurities, impurities from any reverse reacted polyamic acid and the decomposed byproducts of the photo-decomposable material from the alignment film. While the alignment film surface that was swollen during the C-IMR process can be simply dried, the T-IMR process reorganizes the alignment film surface that was swollen during the C-IMR process, thereby increasing the roughness of the alignment film surface. In some embodiments, the T-IMR process may be carried out at about 200° C. for 1000 seconds or less.

While not shown in FIG. 1A, in some embodiments, the alignment film may be rinsed with deionized (DI) water and/or calcination to remove other types of impurities or byproducts generated during the T-IMR process.

It is imperative that the C-IMR process is performed before other impurity removal processes such as thermal impurity removal T-IMR process or rinsing of the alignment film with DI water. Performing other impurity removal process before the C-IMR process described here can decrease the mobility of the high molecular weight impurities and makes it nearly impossible to remove them from the alignment film without breaking the anisotropy.

Without the C-IMR process, removal of the impurities from the alignment film with the T-IMR process and/or DI water rinsing would take hours to complete it, if not days. Even with several hours of T-IMR process, the high-molecular weight impurities generated from the alignment film formed from the precursor mixture including the high molecular weight polyimide would be very difficult. Further, when T-IMR process at such temperature is carried out for more than an hour, the resulting alignment film will turn yellowish and deteriorate the display quality of the LCD device. However, with the high-molecular weight impurities substantially removed from the alignment film by the C-IMR process, the T-IMR process can be performed for only a short duration.

With the two-step impurity removal process the alignment film can be substantially free of the low to large molecular weight impurities. It also removes other kinds of impurities, including but not limited to, polyamic acid and reverse reacted polyamic acid as well as the decomposed byproducts of the cyclobutane, which is highly reactive with the alkenyl single of the negative type liquid crystal and lead to a variety of display defects.

Figure 1D:
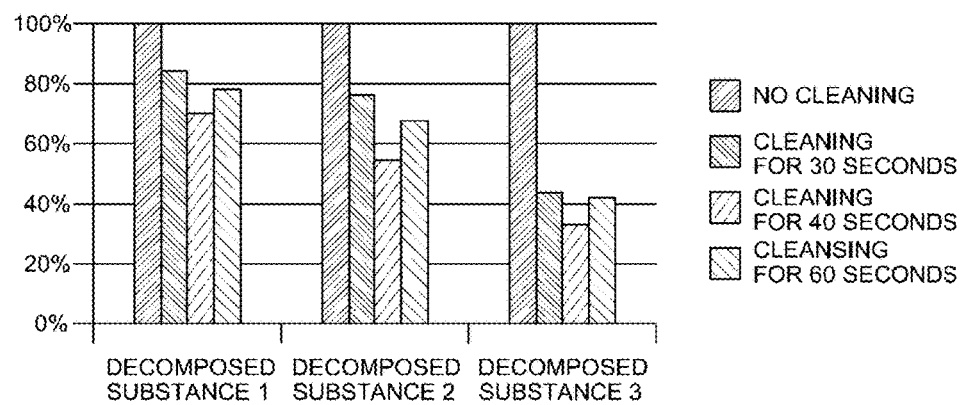
FIG. 1D is a graph provided for explaining a residue of a decomposed substance depending on a cleaning time in a method of manufacturing a liquid crystal display device according to the exemplary embodiment of the present disclosure.

FIG. 1D is a graph provided for explaining the amount of impurities remaining in the alignment film depending on a cleaning time using a lactate-based organic solvent when using the initial amount of impurities right after the UV irradiation as the reference (100%). The decomposed substance 1 is low-molecular impurities (e.g., low molecular weight cleaved parts), the decomposed substance 2 is a mixture of low-molecular weight impurities and high-molecular weight impurities, and a decomposed substance 3 is high-molecular weight impurities.

It can be seen that a residue of the decomposed substance is decreased in the case of 30 seconds of C-IMR process and 40 seconds of C-IMR process with a lactate-based organic solvent. However, in the case wherein the C-IMR process is carried out for 60 seconds, the residue of the decomposed substance is increased. As a residue of the decomposed substance formed by irradiation of UV light is decreased, a display quality of a liquid crystal display device is improved and uniaxial alignment of the alignment film is improved, so as to have improved anchoring force in the alignment film.

Figure 1E:
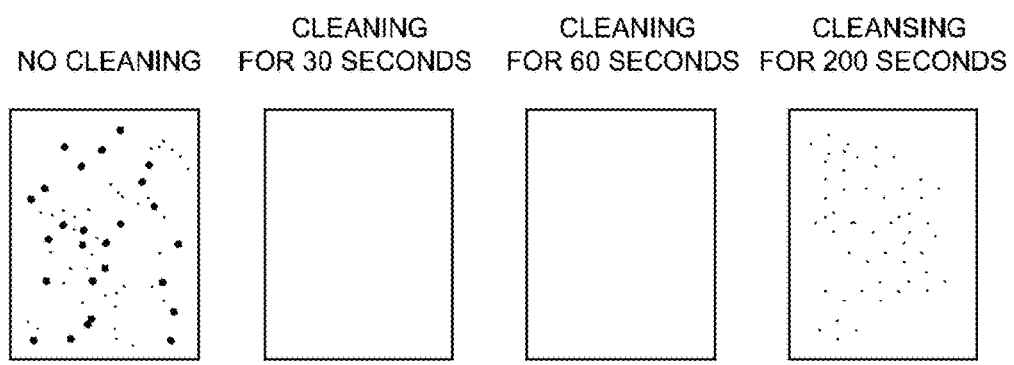
FIG. 1E is a schematic diagram provided for explaining a change in display quality depending on a cleaning time in a method of manufacturing a liquid crystal display device according to the exemplary embodiment of the present disclosure.

FIG. 1E is a schematic diagram that explains a change in display quality depending on the duration of C-IMR process while manufacturing a liquid crystal display device according to the exemplary embodiment of the present disclosure. FIG. 1E shows an image of a liquid crystal display device when vertical upper and lower polarizing plates are positioned, and illustrates a reversed black image. As shown here, several bright spots are present in an image of a panel which is not cleaned, and any bright spot is not observed from images of panels cleaned for 30 seconds and 60 seconds, respectively. Further, it can be observed that C-IMR marks are generated in the panel cleaned for 200 seconds.

Figure 1F:
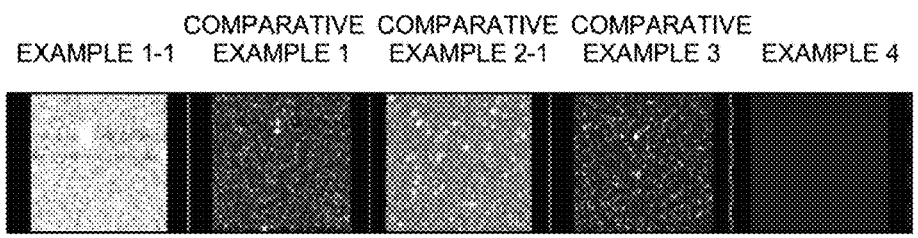
FIG. 1F is an image provided for explaining an amount of bright spots generated on a surface of an alignment film depending on a cleaning substance in a method of manufacturing a liquid crystal display device according to the exemplary embodiment of the present disclosure.
Figure 1G:
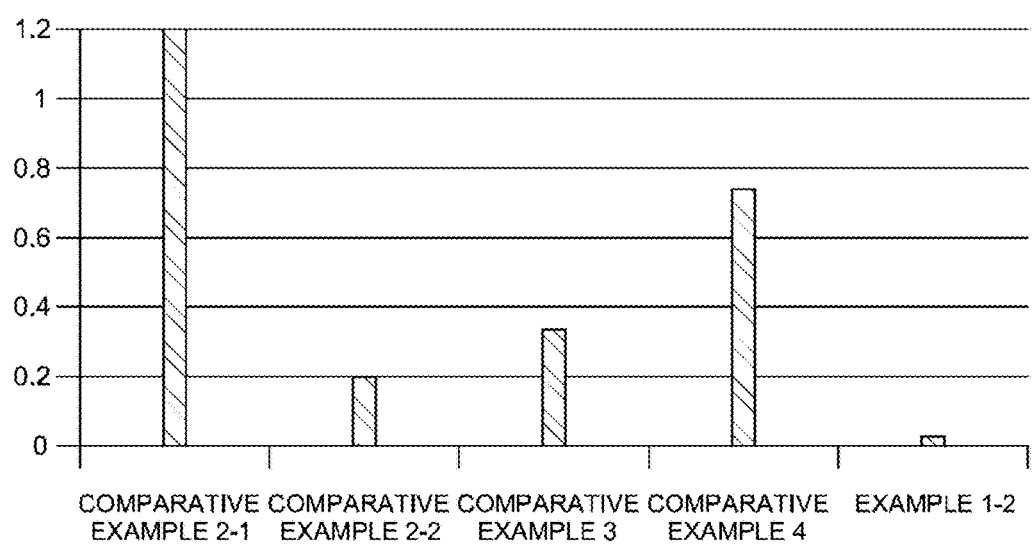
FIG. 1G is a graph provided for explaining AC image sticking of a liquid crystal display device panel depending on a cleaning substance in a method of manufacturing a liquid crystal display device according to the exemplary embodiment of the present disclosure.

FIG. 1F is an image provided for explaining an amount of bright spots generated on a surface of an alignment film depending on the type of chemical used in performing the C-IMR process during the manufacturing a liquid crystal display device. FIG. 1G is a graph provided explaining AC image sticking of a liquid crystal display device panel depending on the type of chemical used in performing the C-IMR process during manufacturing a liquid crystal display device.

EXAMPLE 1-1

The precursor mixture (5 parts by weight) was dissolved in an organic solvent (95 parts by weight). In the precursor mixture, polyimide with cyclobutane accounted for about 30%. The precursor solution was applied on a substrate by an ink-jet printing method and thermal imidization was performed so as to form an alignment film. The thermal imidization was performed at a temperature of about 200° C. Then, polarized UV light having a wavelength of about 254 nm was used to irradiate the alignment film. A lactate-based organic solvent was sprayed to carry out the C-IMR process for 40 seconds by a shower spray method of the alignment film.

EXAMPLE 1-2

In Example 1, the C-IMR process was performed on the alignment film with the lactate-based organic solvent followed by the T-IMR process at 200° C. for 1,000 seconds.

COMPARATIVE EXAMPLE 1

An alignment film was formed in the same manner as Example 1 except that after irradiation of polarized UV light, the C-IMR process was not carried out, and the T-IMR process was performed.

COMPARATIVE EXAMPLE 2-1

A surface of an alignment film was treated in the same manner as Example 1 except that IPA (isopropyl alcohol) and DI water were used to remove impurities from the alignment film.

COMPARATIVE EXAMPLE 2-2

In Comparative Example 2-1, the surface of the alignment film was rinsed with IPA and DI water and then the T-IMR process was carried out at 200° C. for 1,000 seconds.

COMPARATIVE EXAMPLE 3

A surface of an alignment film was treated in the same manner as Example 1 except that IPA was used as a cleaning substance.

COMPARATIVE EXAMPLE 4

A surface of an alignment film was treated in the same manner as Example 1 except that PGMEA (propylene glycol monomethyl ether acetate) was used to perform the C-IMR process.

Referring to FIG. 1F, in Example 1, a bright spot is not illustrated except for a patterned spacer. Meanwhile, in Comparative Examples 2, 3, and 4, multiple bright spots are illustrated, and such bright spots increase a brightness of black and decrease a contrast ratio.

FIG. 1G is a graph illustrating a degree of AC image sticking generated using an alignment film treated according to Examples and Comparative Examples, that is, a change in direction of liquid crystal after a test pattern is applied. First, a direction of liquid crystal was measured, and after a test pattern was applied for 120 hours, a change in direction of the liquid crystal was measured. Example 1-2 illustrated a change of 0.03 degrees, and Comparative Example 2-1 illustrated a change of 1.2 degrees, Comparative Example 2-2 illustrated a change of 0.2 degrees, and Comparative Example 3 and Comparative Example 4 illustrated changes of 0.32 degrees and 0.54 degrees, respectively. In the case of using a lactate-based organic solvent, the main chain of polyimide in the alignment film was not removed and only the cleaved parts by UV light was removed. Therefore, reduction in a molecular weight of the alignment film is decreased, and, thus, an anchoring force in the alignment film is maintained and AC image sticking is reduced. Further, when the T-IMR process is additionally carried out, the decomposed substance is additionally removed and AC image sticking is further reduced.

FIG. 2A to FIG. 2E are schematic diagrams provided for explaining an embodiment of manufacturing an alignment film of a LCD device according to the exemplary embodiment of the present disclosure.

Figure 2A:
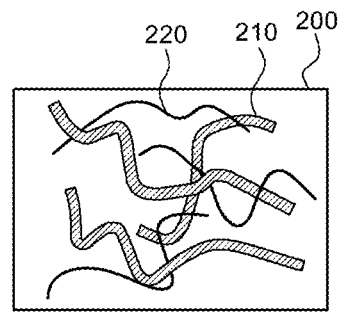
FIGS. 2A, 2B, 2C, 2D, and 2E provide schematic diagrams for explaining a step in which polyimide of an alignment film is decomposed by UV light and a decomposed substance is cleaned in a method of manufacturing a liquid crystal display device according to the exemplary embodiment of the present disclosure.

FIG. 2A illustrates a state of the multi-layered precursor structure, which is formed by applying a precursor mixture including polyimide 210 with a photo-decomposable material and polyamic acid 220 without a photo-decomposable material. Initially, polyimide 210 with a photo-decomposable material and the polyamic acid 220 without a photo-decomposable material are mixed into a precursor mixture and casted on a single layer. When the precursor mixture settles, the polyamic acid 220 without the photo-decomposable material having a higher weight average molecular weight than that of the polyimide with the photo-decomposable material sinks under the polyimide 210, thereby forming the multi-layered precursor structure described above. Then, the thermal imidization process is performed on this multi-layered precursor structure to cause imidization reaction. This forms the multi-layered alignment film 200 having an upper portion and a lower portion.

Figure 2B:
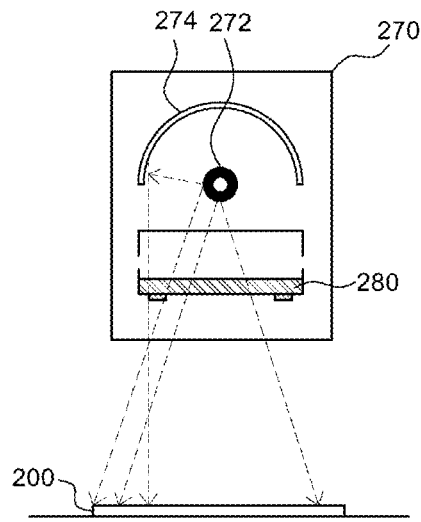

UV irradiation process is carried out on the alignment film 200 by an UV irradiation device 270 as depicted in FIG. 2B. UV light emitted from a lamp 272 is reflected off of a mirror 274 surrounding the lamp 272 is passed through a polarizer 280 before reaching the alignment film 200. The polarized UV light may have a wavelength in a range of from about 200 nm to about 300 nm, preferably between 230 nm to 250 nm.

Figure 2C:
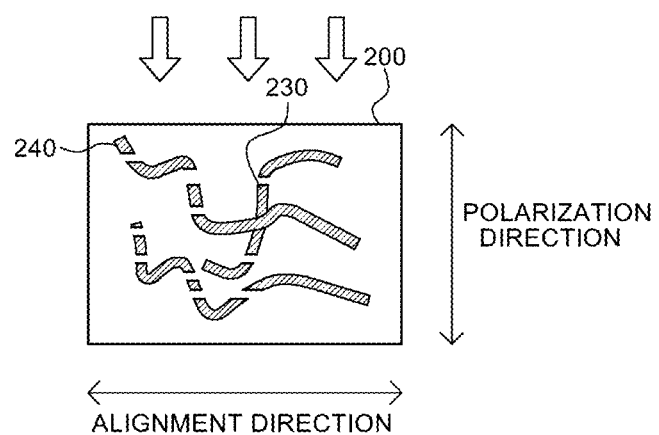

FIG. 2C illustrates the state of the multi-layered alignment film 200 following the UV irradiation in a polarization direction perpendicular to an alignment direction. As shown, the main chain of the polyimide in the multi-layered alignment film 200 is cleaved by the polarized UV light. The main chain of the polyimide oriented in a direction perpendicular to the polarization direction remains and forms anisotropy of the multi-layered alignment film 200. The cleaved parts of the main polyimide chain are denoted as the high molecular weight impurities 230, 240, and 250 in FIG. 2C.

Figure 2D:
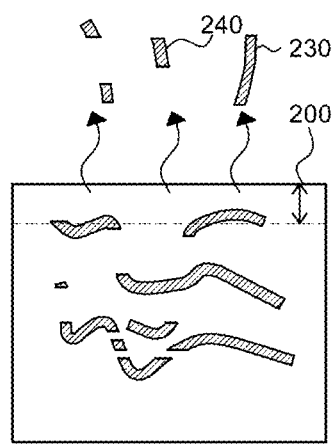

FIG. 2D illustrates the state of the multi-layered alignment film 200 following the C-IMR process using a lactate-based organic solution. The C-IMR process should be carried out with a lactate-based organic solution as it is particularly useful in removing the impurities having high molecular weight. In the C-IMR process, the impurities 230, 240 and 250, having relatively large molecular weight, are removed from the alignment film 200 by the lactate-based organic solution.

More specifically, the lactate-based organic solution temporarily swells the surface of the alignment film 200 and increases the roughness of the alignment film 200. The average height of the alignment film 200 is also increased. The polyimide in the alignment film 200 is not dissolved by the lactate-based organic solution, but is only swollen by the lactate-based organic solution inserted between the chains of the polyimide. This makes it easy to remove the high molecular weight impurities from the alignment film 200.

Here, the lactate-based organic solution may include one or more of methyl lactate, ethyl lactate, n-propyl lactate and n-butyl lactate. Further, the lactate-based organic solution may be mixed with deionized (DI) water. Preferably, the lactate-based organic solution is ethyl lactate. Ethyl lactate has a low volatility in comparison to methyl lactate and has a low molecular weight in comparison to n-propyl lactate or n-butyl lactate.

Figure 2E:
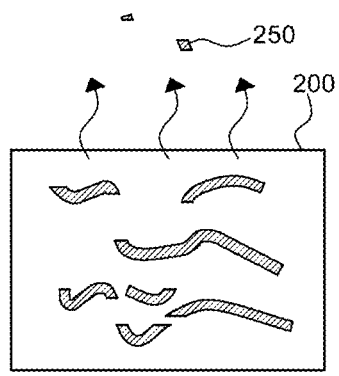

FIG. 2E illustrates the status of the alignment film 200 following the T-IMR process, which is performed by post-baking the alignment film 200 after the C-IMR process. In the T-IMR process, residual impurities 260, which are mostly low-molecular weight parts remaining in the alignment film 200, are evaporated. Further, the heat from the process restructures the surface of the alignment film 200.

Figure 3:
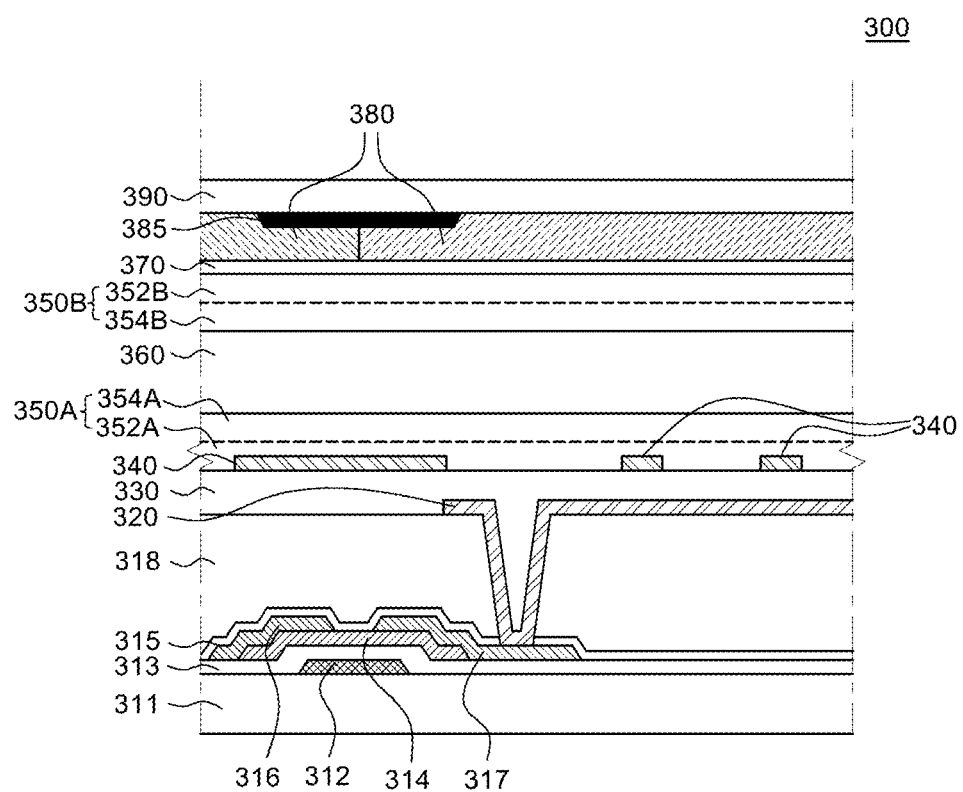
FIG. 3 is a cross-sectional view provided for explaining a liquid crystal display device according to an exemplary embodiment of the present disclosure.

FIG. 3 is a cross-sectional view provided for explaining a liquid crystal display device according to an exemplary embodiment of the present disclosure.

Referring to FIG. 3, in a liquid crystal display device 300, a staggered thin-film transistor including a gate electrode 312, an active layer 314, a source electrode 316, and a drain electrode 317 are formed on a first substrate 311. To be specific, the gate electrode 312 is formed on the first substrate 311, and a gate insulating layer 313 is formed thereon. The active layer 314 is formed on the gate insulating layer 313. The source electrode 316 and the drain electrode 317 are electrically connected with the active layer 314. While the thin-film transistor in the exemplary embodiments of the present disclosure is described as having a staggered structure, it should be noted that the thin-film transistor in the embodiments may have various other structures such as a coplanar structure.

Further, FIG. 3 illustrates that a pixel electrode 320 is connected with the drain electrode 317 assuming that the thin-film transistor is a P-type thin-film transistor. However, if the thin-film transistor is an N-type thin-film transistor, the pixel electrode 320 may be connected with the source electrode 316.

On the thin-film transistor, a first protection layer 315 and a second protection layer 318 for protecting the thin-film transistor are formed. The pixel electrode 320 is formed on the second protection layer 318. The pixel electrode 320 is in contact with the drain electrode 317 through a contact hole of the second protection layer 318. An upper insulating layer 330 is formed so as to cover the pixel electrode 320. On the upper insulating layer 330, a common electrode 340 is formed. The second protection layer 318 is formed of an organic material such as photoacryl and used to increase an aperture ratio. The first protection layer 315 may be omitted.

In the present disclosure, both IPS mode and FFS mode LCD device will be referred to as the IPS type LCD device for simpler explanation. Since the LCD device 300 illustrated in FIG. 3 is an IPS type LCD device, the common electrode 340 is formed on the substrate 311 but not formed on the second substrate 390. In the exemplary LCD device 300 shown in FIG. 3, the common electrode 340 is positioned above the pixel electrode 320. However, arrangement of the common electrode 340 and the pixel electrode 320 is not limited as such. Accordingly, the pixel electrode 320 may be positioned above the common electrode 340. Also, an electrode (not shown) may be formed under the common electrode for additional functionalities, such as touch sensing or lowering the resistance of the common electrode. Such an electrode may be positioned within an organic passivation layer formed of photoacryl. Also, the pixel electrode 320 may be formed on the same plane as the common electrode 340. Further, the common electrode 340 and the pixel electrode 320 may be arranged in a linear shape.

In some embodiments, the common electrode 340 and the pixel electrode 320 may be arranged in a zigzag shape having at least one or more bent portions, and a color filter 380 and a black matrix 385 of a second substrate 390 may be formed into a zigzag shape having at least one or more bent portions. Furthermore, the common electrode 340 or the pixel electrode 320 may be formed into a rectangular shape, and the common electrode 340 or the pixel electrode 320 may be formed in a linear shape or a zigzag shape having at least one or more bent portions.

On the common electrode 340, the liquid crystal layer 360 is interposed between a lower alignment film 350A and an upper alignment film 350B. While a negative dielectric anisotropy LC is preferred for the liquid crystal layer 360, it may be formed of a positive dielectric anisotropy liquid crystal layer. The alignment films (350A, 350B) are configured to set and maintain the initial alignment direction of LC of the liquid crystal layer 360.

In this example, the lower alignment film 350A and the upper alignment film 350B include two portions. The first portion 354A of the lower alignment film 350A refers to the portion positioned towards the liquid crystal layer 360 while the second portion 352A refers to the portion positioned away from the liquid crystal layer 360. Similar to the lower alignment film 350A, the upper alignment film 350B also includes a first portion 354B that is closer to the liquid crystal layer 360 and a second portion 352B that is positioned away from the liquid crystal layer 360. The first portions (354A, 354B) may be in contact with the liquid crystal layer 360 while the second portions (352A, 352B) are not in contact with the liquid crystal layer 360.

The color filter 380, which may include red, green, and blue color filters, is formed under the second substrate 390. The black matrix 385 can be also formed at the underside of the second substrate 390. The black matrix 385 may be formed between the two color filters 380 to prevent mixing of colors. An over coating layer 370 may be interposed between the upper alignment film 350B and the color filter 380.

In both alignment films (350A, 350B), the first portions (354A, 354B) that are positioned towards the liquid crystal layer 360 includes polyimide chains configured to align the liquid crystal molecules. This is necessary for increasing the anchoring force of the alignment films (350A, 350B) and reducing the occurrences of the AC image sticking problem from the LCD device 300.

The second portions (352A, 352B) that are positioned away from the liquid crystal layer 360 should have a lower volume resistance in comparison to the corresponding first portions (354A, 354B) in the respective alignment films (350A, 350B). Having a low volume resistance than the first portions (354A, 354B) is important for the second portions (352A, 352B) as the second portions (352A, 352B) serve to discharge the charges accumulated in the alignment films (350A, 350B) and/or to suppress charges from being accumulated in the alignment film (350A, 350B) from the outset. The volume resistance of the second portions (352A, 352B), which is lower than the volume resistance of the first portions (354A, 354B) reduces the occurrences of DC image sticking from the LCD device 300.

The alignment films (350A, 350B) having the first portions (354A, 354B) and the second portions (352A, 352B) can be formed from a precursor mixture including a first precursor and a second precursor having a different weight average molecular weight from each other. The difference between the weight average molecular weight of the first and second precursor materials facilitates formation of the first portions (354A, 354B) and second portions (352A, 352B) of the alignment film (350A, 350B).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus, comprising:
   a substrate;
   an alignment film on the substrate, the alignment film imparted with anisotropy having alignment generated using irradiation of UV light;
   a liquid crystal layer on the alignment film, wherein the alignment film includes polyimide with a molecular weight of 100,000 Da or more, and has a surface that is substantially free of impurities generated from the irradiation of the UV light, and
   wherein the polyimide is formed from at least a first precursor with a photo-decomposable material and the first precursor with the photo-decomposable material is a compound represented by Chemical Formula 1:

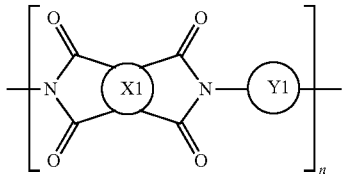

[Chemical Formula 1]

wherein, X1 represents cyclobutane, Y1 represents an aromatic hydrocarbon group having 2 or more rings, and n represents a natural number, and
   wherein the polyimide is formed from at least a second precursor without the photo-decomposable material and the second precursor without the photo-decomposable material is a compound represented by Chemical Formula 2:

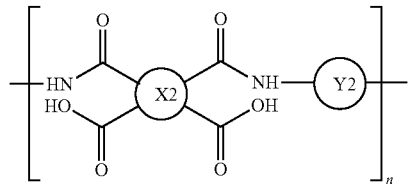

[Chemical Formula 2]

wherein X2 represents an aromatic hydrocarbon group having 2 or more rings, Y2 represents an aromatic hydrocarbon group having 1 or more rings, and n represents a natural number.

2. The apparatus of claim 1, wherein a common electrode and a pixel electrode are disposed on the substrate.

3. The apparatus of claim 1, wherein the liquid crystal layer includes negative dielectric anisotropy liquid crystal molecules.

4. The apparatus of claim 1, wherein the alignment film has a volume resistance of $1.0 \cdot 10^{15} \Omega \cdot cm$ or higher.

5. The apparatus of claim 1 wherein the first precursor further includes polyamic acid with the photo-decomposable material.

6. The apparatus of claim 1 wherein the polyimide with the photo-decomposable material accounts for at least 80% of the first precursor.

7. The apparatus of claim 1 wherein the photo-decomposable material includes cyclobutane.

8. The apparatus of claim 1 wherein the second precursor further includes an additive having one or more of polyamic acid ester without the photo-decomposable material and polyimide without the photo-decomposable material.

9. The apparatus of claim 1, wherein the second precursor has a higher weight average molecular weight than a weight average molecular weight of the first precursor.

10. The apparatus of claim 1, wherein the alignment film includes a first layer and a second layer, and the first layer is formed from the first precursor, and the second layer is formed from the second precursor.

11. The apparatus of claim 10, wherein a volume resistance of the first layer is higher than a volume resistance of the second layer.

\* \* \* \* \*